(12) United States Patent
Dabby

(10) Patent No.: US 6,474,107 B1
(45) Date of Patent: Nov. 5, 2002

(54) FLUORINATING AN OPTICAL FIBER PREFORM IN A PURE ALUMINUM OXIDE MUFFLE TUBE

(76) Inventor: Franklin W. Dabby, 515 Loring Ave., Los Angeles, CA (US) 90024

( * ) Notice: Subject to any disclaimer, the term of this patent is extended or adjusted under 35 U.S.C. 154(b) by 901 days.

(21) Appl. No.: 08/758,906

(22) Filed: Dec. 2, 1996

(51) Int. Cl.[7] .............................................. C03B 37/018

(52) U.S. Cl. ..................... 65/397; 65/374.13; 65/426; 65/427

(58) Field of Search ............................ 65/374.13, 397, 65/426, 427

(56) References Cited

U.S. PATENT DOCUMENTS 5,114,338 A * 5/1992 Tsuchiya ..................... 65/157

* cited by examiner

Primary Examiner—John Hoffmann
(74) Attorney, Agent, or Firm—Hogan & Hartson L.L.P.

(57) ABSTRACT

A method for fabricating fluorine doped, silica based glass and fiber by depositing a layer of high purity silica soot on a core rod while rotating the core rod places the rod of pure fused silica or doped fused silica and silica soot in a furnace having a lining of $Al_2O_3$, elevates the temperature in a fluorine rich atmosphere to establish the proper differential in the indices of refraction between the core start rod and the deposited layer, and heats the resulting rod at consolidation temperatures in an atmosphere of helium to form a preform. The apparatus includes a furnace having a lining of high purity alumina that is resistant to chemical etching and change normally due to the fluorine and chlorine.

11 Claims, 3 Drawing Sheets

FLUORINATING AN OPTICAL FIBER PREFORM IN A PURE ALUMINUM OXIDE MUFFLE TUBE

BACKGROUND OF THE INVENTION

1. Field of the Invention

The present invention relates to the art of high purity glass and glass optical fiber for transmitting light wave signals, and more particularly to the art of fabricating fused silica optical waveguides and glass preforms.

2. Description of the Prior Art

In the past, optical fibers of fused silica, $SiO_2$, have been formed from preforms in which the relationship of the relatively higher index of refraction of the core to a relatively lower index of refraction of the cladding is predetermined so that when the preform is drawn into a fiber, the fiber will conduct light at predetermined wavelengths, either in single mode or in multi-mode form. The performance of fused silica optical fibers is determined by the amount of attenuation or loss, and by dispersion. Attenuation is presently considered to be the result of absorption and scattering, both of which may be the result of irregularities or imperfections in the formation of the fiber, or of its preform. Dispersion is the result of changes in the refractive indices with wavelength.

For optical fibers to be effective, the attenuation must be minimized. The elimination of attenuation, or loss, has been achieved in the past for the most part by eliminating the impurities in the fused silica, except for the dopant or dopants necessary to control the differential in the indices of refraction between the core and the cladding. Even for the dopant or dopants, a high degree of purity has been sought to achieve sharp fiber profiles and performance.

It was known early that one of the impurities in silica that absorbed light, and thus caused higher attenuation or loss, was the hydroxyl ion (Off). Various methods and processes for reducing the hydroxyl ion were taught, among them the reduction of hydroxyl ions in the silica in the preform's formation stage by fluorination. See, for example, U.S. Pat. No. 4,579,571 to J. W. Hicks, Jr., which well sets forth the benefits of expelling the hydroxyl ions from the preforms formed by flame hydrolysis by drying the preforms by adding fluorine not only as a drying agent, but also to reduce the refractive index of the cladding.

Fluorination of the silica can be accomplished by depositing silica soot onto a start rod, and placing the start rod with the deposited silica soot in a space or zone, sometimes called a muffle, of a furnace which is made rich in fluorine. Sometimes, the pressure in the space, zone or area of the muffle in which the silica preform is sintered, is raised and the temperature is elevated so that the fluorine in the atmosphere is coerced into the interstices of the silica to expel the hydroxyl ions and to dope the silica with the fluorine. In all of these methods, one of the objects, and often the primary object is the reduction of the refractive index of the cladding glass after sintering and secondarily reduction of the hydroxyl ions by fluorination.

One of the ever present problems in fluorination is the very high reactivity of fluorine with almost all materials. Attempts have been made in the past to use various materials for the structure of the furnace in which fluorination takes place. Most workers in the art have returned to using fused silica for the composition of that part of the furnace structure that faces the interior of the muffle space or zone.

Silica, however, dissipates in the face of the very active fluorine in the fluorinating processes. The silica structure, consequently, has to be replaced after only a few uses of the muffle or muffle tube, or alternatively the muffle tube becomes a part of the preform. These unhappy and expensive results are described, for example, in Abe, U.S. Pat. No. 4,643,751. The problems are exacerbated when such a silica wall surrounding the reaction zone is broached, and the highly reactive hydrogen fluoride (HF) escapes. In an effort to reduce the corrosion due to fluorine, chemical forms of fluorine that are inert at room temperatures, such as, for example sulfur hexafluoride are used to supply the fluorine. Reactive fluorine results; however, from the high temperature dissociation of sulfur hexafluoride ($SF_6$), and forms hydrogen fluoride from the interaction of the fluorine with the hydrogen from the $OH^{-1}$ ions imbedded in the soot. Abe, cited above, made the silica muffle tube become part of the preform.

Efforts have been made in the past to realize a substitute for the silica muffle tube in the drying, fluorinating and sintering furnace. For example, one attempt was made to substitute alumina as the composition for the furnace wall in the muffle. However, it was reported that the fluorine so reacted with the alumina muffle that aluminum and possibly other impurities were imparted into the silica preforms. See, for example, Berkey, U.S. Pat. No. 4,629,485, where such an attempt to substitute alumina resulted in a thick devitrified surface layer on the preform that rendered the preform useless.

Aluminum oxide, however, if it could be used, would last substantially longer than silica in the highly reactive environment of fluorine, and consequently it remains a highly sought objective to make at least the interior surface of the muffle of alumina. However, it is an objective to have an alumina surfaced muffle in the drying, fluorinating and sintering furnace where the glass optical preform and/or fiber resulting from its use does not have impurities from the alumina go into the preform or fiber. Further, it is highly desired in any use of a substitute for the silica composition, that no devitrified surface layer forms on the preforms that would render the preform useless.

SUMMARY

In brief, in accordance with one aspect of the present invention, a silica soot is deposited on a start rod or core rod, which is then lowered into a muffle or zone of a furnace in which the atmosphere is maintained with highly reactive fluorine. The muffle or zone in the furnace has an interior facing surface which is composed of a high purity aluminum oxide. The purity is of the order of-one or less parts per million of sodium, calcium, potassium, iron and titanium, with an alumina ($Al_2O_3$) content of 99.97%. The temperature is raised to a level suitable for drying and removing water from the soot deposited core rod. The core rod having the soot formed on it may be dried separately in a fluorine or chlorine atmosphere maintained in the muffle or zone. The fluorine may continue to dope into the soot cladding. The temperature in the muffle or zone is raised again to a predetermined level so that the fluorine is doped into the deposited soot. The temperature is raised yet again to another level for sintering and consolidating the core rod with soot preform into a glass.

These and other novel aspects of the invention, together with other aspects thereof, can be better understood by the following description of the preferred embodiments, which are designed to be read in conjunction and together with the accompanying drawings.

DESCRIPTION OF THE PREFERRED EMBODIMENT

Very thin communications grade optical fiber is made often from a preform having a core and a cladding corresponding in ratios and geometry to those of the ultimate glass fiber desired to be drawn from the preform. The composition of the core and cladding must be such that there is a lower index of refraction in the cladding than in the core in order to guide the light waves propagating through the waveguide. A preform can be made by building up first a start rod and forming it into a glass that will eventually become the core of the fiber. A cladding layer can then be built up on the core rod or start rod by deposition techniques.

Figure 1:
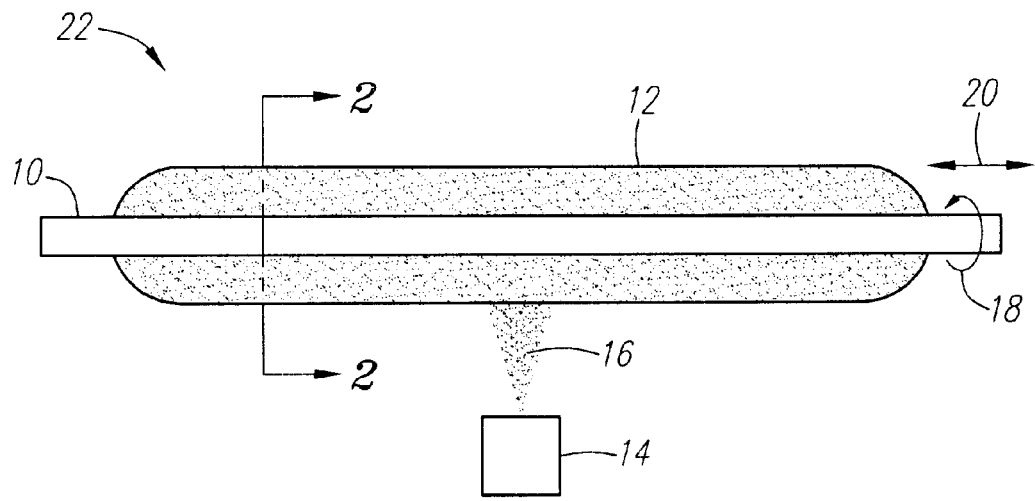
FIG. 1 is a side elevational, partial cross-sectional view of a start rod showing a depositing of silica soot.
Figure 2:
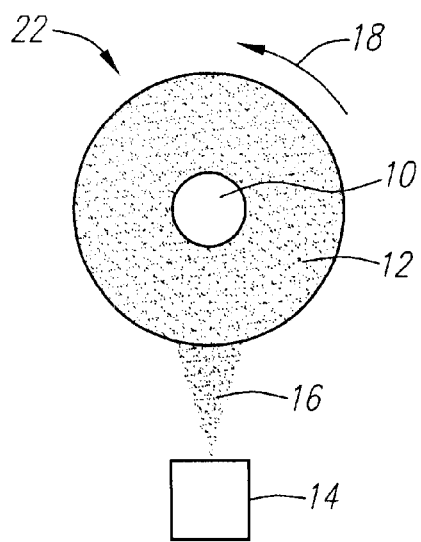
FIG. 2 is a cross-sectional view of the start rod of FIG. 1 taken along line 2—2 showing a depositing of silica soot.

A preform 22 is made starting with a cylindrical core rod or start rod 10, reference being had initially to FIGS. 1 and 2 of the accompanying drawings in which reference numerals used will correspond to like reference numerals in this specification. The core rod 10 is a pure fused silica ($SiO_2$) glass. The start rod or core rod 10 can be formed using much of the same techniques as used in making the cladding, without the insertion of fluorine to lower the index of refraction, which will be described in greater detail herein, or by other methods that are known. Other methods may call for a carefully doped fused silica.

The cladding material 12, in the preferred embodiment starting as a pure fused silica soot or doped fused silica soot, is deposited on the core rod 10 by directing from a nozzle 14 a stream 16 of the soot material 12. If it is desired to have germanium oxide or other material as the dopant for the cladding, the soot material will be a mixture of a soot of fused silica and amounts of a soot of the dopant so that the glass resulting after fluorination will have an index of refraction which will be lower than the index of refraction of the core material 10. The higher index of refraction of the core material 10 from that of the cladding material 12 results in an effective light waveguide. A method of making a fluorinated preform is described in U.S. Pat. No. 5,364,430 to Sarkar and U.S. Pat. No. 4,629,485 to Berkey.

The soot 12 is evenly distributed and placed on the core rod 10 by rotating the core rod 10 in the direction shown by the arrow 18. In addition, the core rod 10 is translated reciprocally along its axis in the directions of the arrow 20, to expose the core rod 10 evenly along the length of the preform 22 to the stream 16 of the soot.

The stream 16 of soot 12 is directed within a closed chamber, not shown, from a burner and nozzle 14 representatively depicted. The burner is comprised of a flame generator and a continuous supply of the gases that react to form the soot composition to be directed out of the burner along with the flame towards the core rod 10 in the stream 16. The temperature at the surface of the core rod 10 is elevated to from approximately 900 to 1350 degrees Centigrade to receive and hold the soot 12. More details and alternative methods of forming the cladding soot 12 on the start rod 10 can be seen from U.S. Pat. No. 5,364,430.

The burner inside the nozzles 14 produces a flame to raise the temperature of the soot mixture to oxidation temperature. Further details of such a deposition arrangement may be found in the art, such as for example, U.S. Pat. No. 3,826,560, U.S. Pat. No. 4,148,621, and U.S. Pat. No. 4,173,305. A suitable nozzle may be see in U.S. Pat. No. 3,957,474. Burners are described in U.S. Pat. No. 3,565,345 and U.S. Pat. No. 4,165,223.

FIG. 2, a cross-section of the preform of FIG. 1 taken along line 2—2 of FIG. 1, shows the relative diameter difference for the core 10 and the cladding soot 12 being deposited onto the core or start rod 10 by the soot material being directed towards the core rod 10 through the soot stream 16 from nozzle 14, while the core rod core 10 is rotated in the direction of arrow 18 and is translated along the axial direction defined by the core 10.

Figure 3:
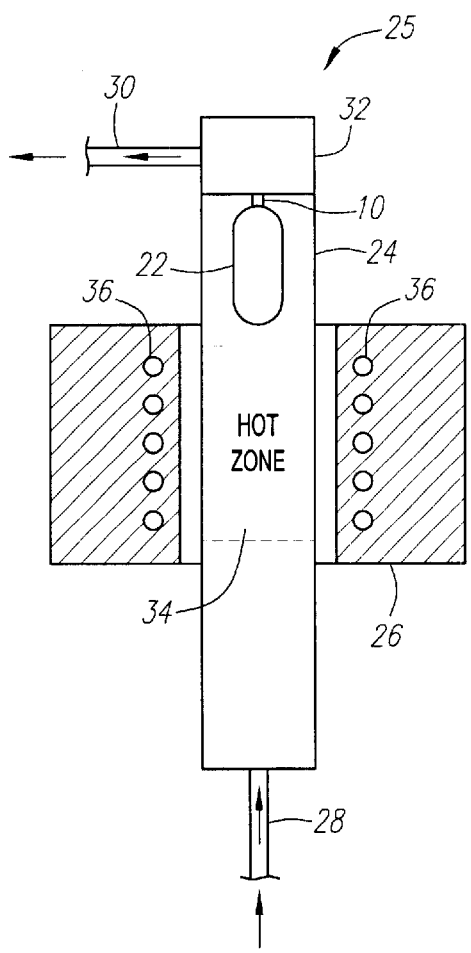
FIG. 3 is a side elevational, partial cross-sectional view of a silica and silica soot preform in a furnace.
Figure 4:
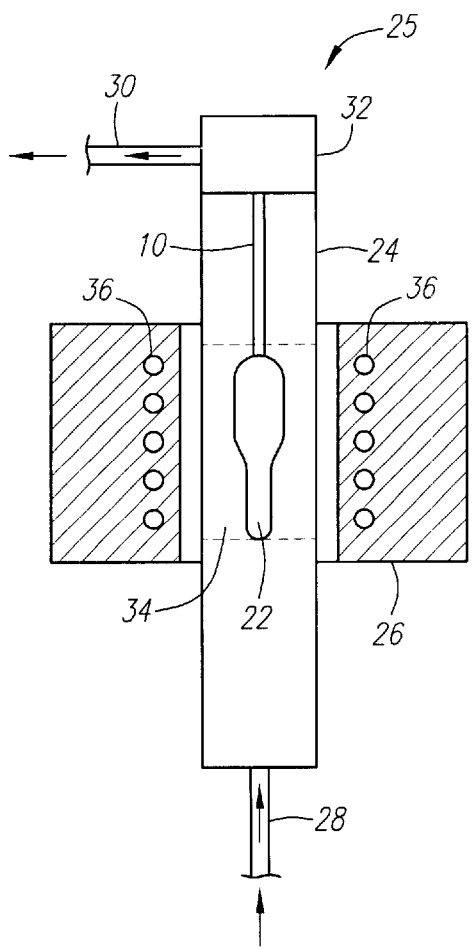
FIG. 4 is a side elevational, partial cross-sectional view of the silica and silica soot preform of FIG. 3 in a second position within the furnace.

As better seen in FIGS. 3 and 4 of the accompanying drawings, the preform 22 having the cladding in the form of soot 12 is then prepared for drying, fluorination and sintering. The preform 22 comprised of the soot cladding 12 and the core 10 is placed in a muffle tube or chamber 24 of a furnace 26. Drying can be accomplished by elevating the temperature in the furnace 26 to approximately 1150 to 1250 degrees Centigrade and making the atmosphere within the furnace 26 hydrophilic by making it rich in a gas, such as chlorine, that forces water or hydroxyl ions ($OH^{-1}$) out of the soot 12.

The drying gas is introduced into the muffle tube 24 of the furnace 26 through inlet port 28. Often, chlorine is used for such drying. However, fluorine can eliminate hydroxyl ions from the soot 12 but also can become a dopant in the soot 12 to impart an index of refraction to define the cladding of the fiber. In the case of fluorine doped silica, the index of refraction is lowered to result in an index different from that of the core 10, where the core 10 is pure fused silica.

Figure 5:
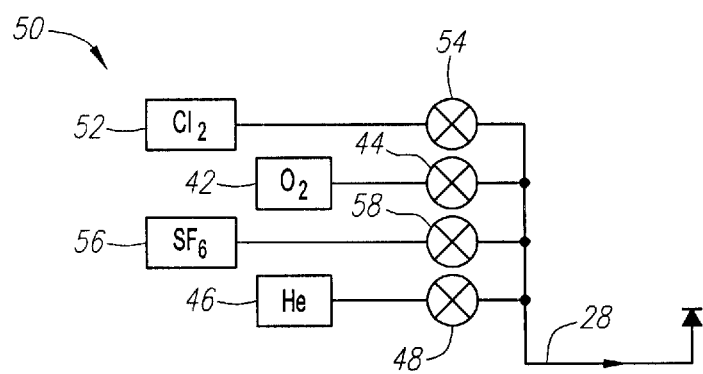
FIG. 5 is a schematic diagram of a valved gas flow for the furnace of FIGS. 3 and 4; and, FIG. 6 is a block diagram showing the preferred embodiment of the method of the present invention.

The gas flows are controlled and fed into the inlet port 28 from the gas reservoirs, as shown schematically in FIG. 5 of the drawings. An oxygen reservoir 42 has the flow of its oxygen into the inlet port 28 controlled by mass flow control valve 44. Similarly, the flow of helium from the helium reservoir is controlled by mass flow control valve 48, which valves the flow into inlet port 28. In like manner, the flow of chlorine from the chlorine reservoir 52 is controlled by mass flow control valve 54. The flow of fluorine from the sulfur hexafluoride ($SF_6$) reservoir 56 is controlled by mass flow control valve 58.

For drying, the temperature is elevated over a twenty minute period to a temperature of from 1000 to 1150 degrees Centigrade. An oxygen flow of 140 standard cubic centimeters per minute ("scc/m"), a helium flow of 7000 scc/m and a chlorine flow of 350 scc/m are maintained. The preform 22 is kept in the muffle tube 24 for a period of approximately thirty minutes at 1150 degrees Centigrade, and withdrawn from the hot zone 34 thereafter slowly during a ten minute time period.

The muffle tube 24 and the preform 22 are purged by dry helium and dry oxygen being injected into the muffle tube 24 through the inlet port 28. The process of purging is described in greater detail in U.S. Pat. No. 5,318,611. The injection of helium is controlled at a rate of 6.0 standard liters per minute ("sl/m"), and the injection of oxygen is controlled at a rate of 400 scc/m for a period of approximately sixty minutes. The preform 22 and muffle tube 24 are then purged by increasing the flow of helium to 7.0 sl/m for approximately thirty minutes. The chlorine flow at a reduced level may be maintained to scavenge any residual moisture in the helium or oxygen.

The gas is expelled from the muffle tube 24 through the outlet port 30. The pressure within the muffle tube 24 is controlled by the pressure control chamber 32 at the upper end of the muffle tube 24. The preform 22 is then removed from the hot zone 34 in the muffle tube 24 while the tube 24 is purged and cleaned by a flow of helium at a rate of 7000 scc/m for a period of approximately seventy (70) minutes. The temperature of the hot zone 34 is maintained at approximately 1450 degrees Centigrade during this purging period.

The preform 22 is then sintered, reference being had to FIG. 4. The temperature within the furnace 26 is elevated over a period of forty minutes by energizing the heating coils 36, to a third or consolidation level of 1450 degrees Centigrade. Sulfur hexafluoride dissociates in the hot zone 34 into reactive fluorine gas. The flow rate of sulfur hexafluoride into the muffle tube 24 is maintained at a rate of 135 scc/m. The preform 22 having the cladding in the form of soot 12 is lowered slowly through the muffle tube 24 through the hot zone 34 within the muffle tube 24 at a rate of 0.2 cm/minute. The preform 22 is held within the hot zone 34 for 180 minutes while the flow rate of helium is maintained at 7000 scc/m. The helium flow will remove the chlorine or other drying gas from the preform 22.

The structure of the muffle tube 24 in the preferred embodiment is made from aluminum oxide ($Al_2O_3$) in the present invention. The aluminum oxide walls must be highly pure. It is considered that a purity of 99.97% aluminum oxide will provide a glass muffle tube wall 24. The aluminum oxide wall should have a bulk density of approximately 3.99 grams/cubic centimeter and a water absorption of virtually zero. The aluminum oxide wall should have a service temperature of up to approximately 1800 degrees Centigrade. A high total and inline visual transmittance would be a good indicator of the purity desired for the muffle tube wall 24 of the preferred embodiment. It is believed that a visual transmittance of 96% will be satisfactory. The aluminum oxide wall of the composition preferred for this invention should have less than one part per million ("ppm") each of sodium, of potassium, of iron and of titanium. A low content of silicon, for example approximately 28 ppm, and of calcium, for example one ppm, is preferred. Magnesium at a level of approximately 250 ppm is also preferred.

An aluminum oxide muffle tube will be amorphus and not polycrystaline. Such a composition for the muffle tube 24 will provide a higher softening point than a silica tube. The higher the softening point of the alumina allows for a greater pressure of fluorine to be maintained in the muffle tube 24 than can be achieved in a silica muffle tube. At 1450 degrees Centigrade, a silica muffle tube will balloon under a pressure only slightly higher than atmospheric or surrounding pressures. The higher the fluorine pressure, the greater the infusion of the fluorine into the cladding soot 12, and the more the refractive index of the cladding being doped by the fluorine in the alumina muffle tube 24 of the present invention is lowered.

The muffle tube may have the aluminum oxide applied to the interior of the muffle tube so as to form an $Al_2O_3$ surface to face the highly active fluorine.

Figure 6:
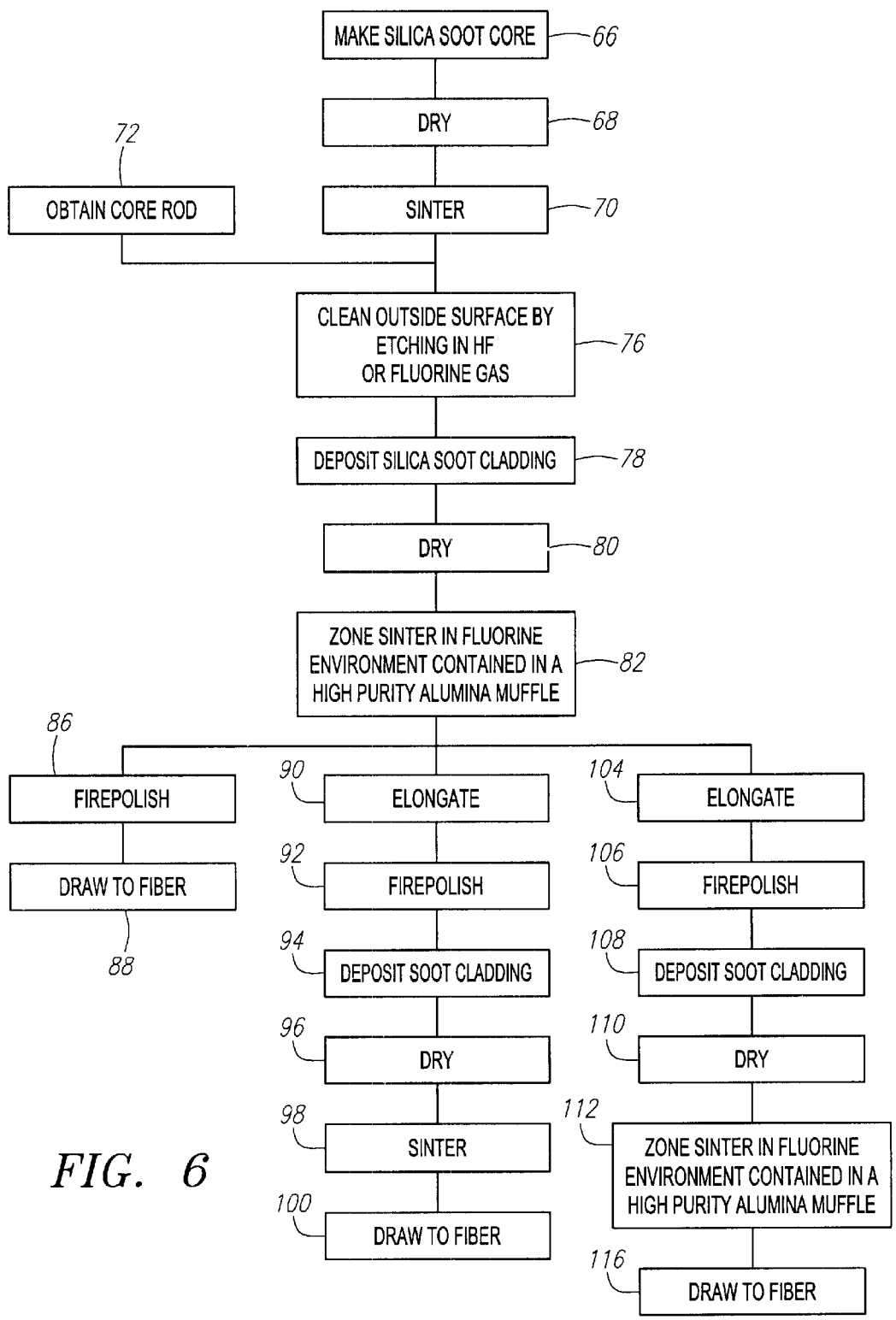

In operation, as seen better in the schematic block diagram of FIG. 6 of the accompanying drawings, first a core rod or a start rod 10 is formed. A silica soot initially is deposited or formed 66 on a mandrel to make a silica soot core. The silica soot core is then dried 68 at the same temperatures, and with the same gases and gas flow rates within the same time periods as set forth herein above for drying silica soot 12 on the core rod 10.

This silica soot core then is sintered 70 into a glass core rod 10. In this sintering step 70, the temperature is elevated over a period of forty minutes to a consolidation level, or approximately 1450 degrees Centigrade. The gas used to flow through the muffle tube 24 does not include fluorine, which may dope the resulting glass. Instead, chlorine and helium is used. The chlorine flow should be maintained at the same flow rate of 135 scc/m. The silica soot core is then lowered slowly through the muffle tube 24 through the hot zone 34 within the muffle tube 24 at a rate of 0.2 cm/minute. The silica soot core is held within the hot zone 34 for 180 minutes while the flow rate of helium is maintained at 7000 scc/m. The helium flow will remove the chlorine or other drying gas from the preform 22.

As an alternative to making the glass core rod 10 as described, the core rod 10 may be obtained 72 directly. In either case, the surface of the core rod 10 is examined for scratches, dirt or other imperfections which may be cleaned. Cleaning 76, if necessary, may be accomplished by etching with hydrofluoric acid or with a flow of fluorine gas. Heating the fluorine gas will increase the activity of the fluorine gas. A fire polishing, however, is not indicated because the hydrogen and oxygen may combine to introduce unwanted $OH^{-1}$. Such a cleaning, however, may not be necessary.

A deposit of silica soot 12 is evenly distributed 78 over a predetermined length of the core rod 10, and placed in a furnace 26 having a muffle tube 24 of alumina having a purity of 99.97% aluminum oxide. The resulting preform 22 is dried 80. During the drying process, helium and oxygen is made to flow through the muffle tube 24 at the flow rates for the time periods as described above.

The muffle tube 24 is then purged. The hot zone 34 of the alumina muffle tube 24 is preheated, and the preform is then sintered 82 by lowering it at a prescribed rate into the preheated muffle tube 24 while the flow rates for helium, chlorine and fluorine are maintained as described above. After maintaining the preform 22 within the muffle tube at the temperature and subjected to the He, Cl and $SF_6$ flow rates set forth above, the preform is cooled down at a predetermined rate to result in a properly sintered and usable preform.

The preform then should be examined for imperfections that can be cleaned, as described. If necessary, the surface of the preform then may be cleaned, as indicated in block 86. In this cleaning step 86, the same procedure may be used for cleaning as in step 76 above. Alternatively, the step 86 may be accomplished by a firepolishing. This step 86 may not be necessary, and may be by-passed if the surface does not have imperfections or is sufficiently clean. The preform may then be drawn 88 into a waveguide having the ratios of diameters and difference of indices of refraction as predetermined.

Alternatively, the preform 22 can be elongated 90 to reduce the diameters of the core 10 and cladding 12, in preparation for addition of a further cladding layer. In this alternative process, after elongation 90, the surface of the preform can be cleaned 92 without introducing OH, by hydrofluoric acid etching. The surface of the preform may be cleaned with a fire-polishing. Since there is already a cladding of sufficient thickness, the OH that may be introduced into the surface by a firepolish is far enough away from the core in which the light travels. The transmitting light, consequently, does not "see" the surface OH, and no increase in attenuation due to the OH will occur, all as described by Sarkar, U.S. Pat. No. 5,364,430. The cleaning step 92 may not be necessary, and may be by-passed, for the reasons and as described herein above for step 68.

A further deposition 94 of silica soot is then applied to the preform 22. After deposition 94, the preform 22 is dried 96 and then sintered 98. In this alternative, the sintering step 98 does not use fluorine, and is performed as set forth for step 70 herein above. The resulting glass preform then can be drawn 100 into a fiber or a waveguide.

In yet another alternative process, the preform 22 is elongated 104. Again, after examination, the surface of the preform 22 can be cleaned 106 without introducing OH by hydrofluoric acid etching. If there is already fabricated or built onto the core 10 a cladding of sufficient thickness so that the OH that may be introduced into the surface by a firepolish will not be "seen," as described above in the description for step 92, a cleaning by firepolish may be used without affecting the attenuation of the resulting fiber due to OH.

Another layer of silica soot is then deposited 108 on the cladding 12. The silica soot preform is then dried 110 in a similar manner and method as described for adding a further cladding layer in the steps of schematic block 96. The preform is then sintered 112 by lowering it at a prescribed rate into the preheated muffle tube 24 of alumina while the flow rates for helium, chlorine and fluorine are maintained as described for step 82 herein above. above. After maintaining the preform 22 within the muffle tube at the temperature and subjected to the He, Cl and $SF_6$ flow rates set forth above, the preform can then be drawn 116 into a fiber or a waveguide.

The foregoing detailed description of my invention and of preferred embodiments as to products, compositions and processes, is illustrative of specific embodiments only. It is to be understood, however, that additional embodiments may be perceived by those skilled in the art. The embodiments described herein, together with those additional embodiments, are considered to be within the scope of the present invention.

I claim:

1. A method of making a fluorine-doped, silica-based glass in a structure having an interior and an interior surface comprising the steps of:
   a. fluorinating silica soot in the interior of the structure the interior surface of the structure being formed of aluminum oxide, and the aluminum oxide having a concentration of at least about 99.97% facing the soot; and
   b. forming the silica soot into the glass.

2. The method of claim 1 wherein said surface of aluminum oxide has a potassium content of less than one part per million, a calcium content of no more than approximately one part per million, a silicon content of no more than approximately twenty-eight parts per million, and a magnesium content of no more than approximately two hundred and fifty parts per million.

3. The method of claim 1, substantially all of the structure being a muffle, and the aluminum oxide having a visual transmittance of 96%.

4. The method of claim 1 wherein the fluorination step is conducted in the presence of helium within said structure.

5. The method of claim 1 further comprising the step of drying the soot in the presence of chlorine prior to said step of fluorinating the soot.

6. The method of claim 1 further comprising the step of drying the soot in the presence of chlorine during step of fluorinating the soot.

7. The method of claim 1 further comprising the step of rotating said soot.

8. The method of claim 1 further comprising the step of elevating the temperature of said structure to a consolidation temperature after said fluorinating step for a time sufficient to consolidate said soot.

9. The method of claim 1 further comprising the step of maintaining pressure within said structure substantially equal to the ambient pressure outside the structure.

10. The method of claim 1 further comprising the step of increasing the pressure within the structure to a level higher than the ambient pressure outside the structure.

11. A method of making a fluorine-doped silica-based glass comprising the steps of:
    a. placing a preform of soot into a structure that at least partially encloses the preform, the structure comprising a surface facing the preform of soot, and the surface comprising aluminum oxide having a concentration of at least about 99.97%;
    b. rotating the preform;
    c. heating the interior of the structure to a dissociation temperature;
    d. fluorinating the preform while maintaining the dissociation temperature within the structure; and
    e. heating the preform to a consolidation temperature for a time sufficient to cause the preform to consolidate.

* * * * *